No. 773,750. PATENTED NOV. 1, 1904.
E. G. KAY.
EYEGLASSES.
APPLICATION FILED JAN. 6, 1904.
NO MODEL. 2 SHEETS—SHEET 1.
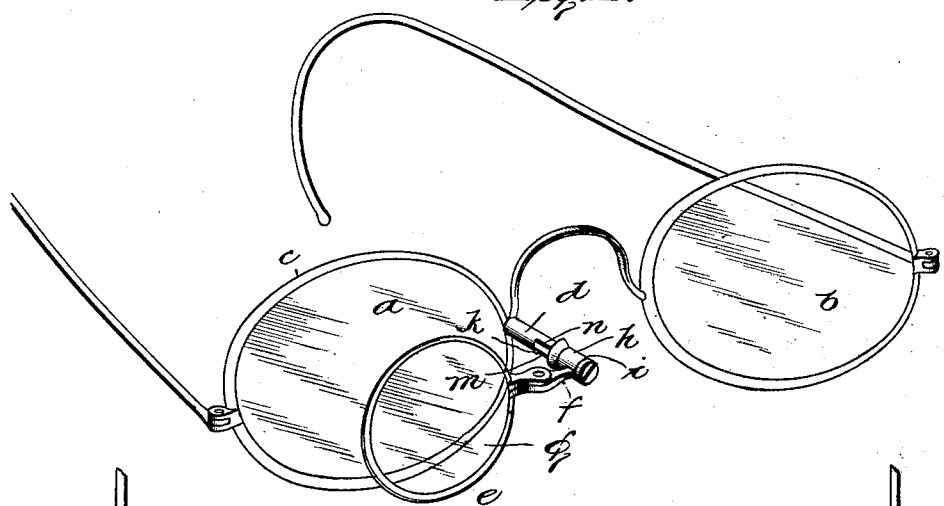
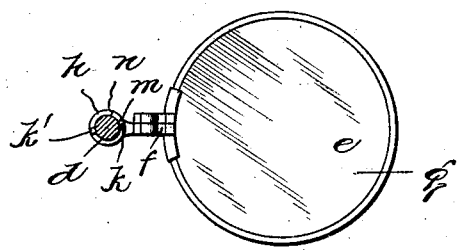
WITNESSES:
INVENTOR
Elmer G. Kay
BY
William F. Hall Attorney No. 773,750. PATENTED NOV. 1, 1904.
E. G. KAY.
EYEGLASSES.
APPLICATION FILED JAN. 6, 1904.
NO MODEL. 2 SHEETS—SHEET 2.
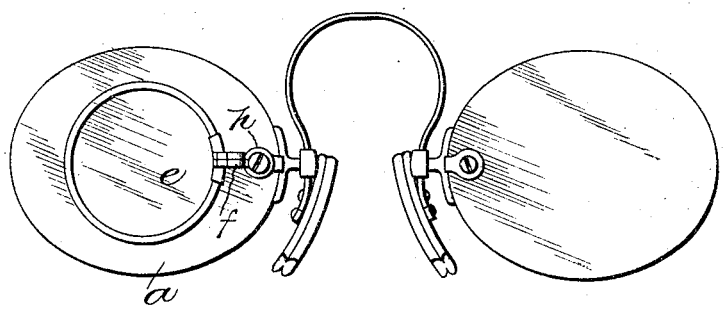
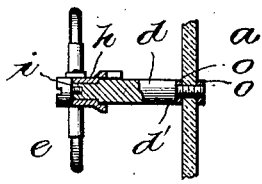
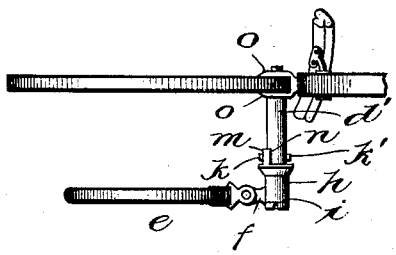
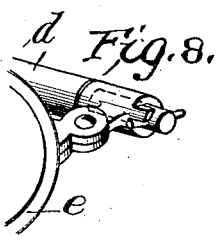
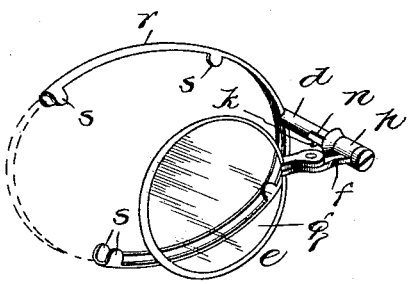
WITNESSES:
INVENTOR
Elmer G. Kay
BY
William F. Hall
Attorney No. 773,750. Patented November 1, 1904.

UNITED STATES PATENT OFFICE.

ELMER G. KAY, OF EVERETT, WASHINGTON.

EYEGLASSES.

SPECIFICATION forming part of Letters Patent No. 773,750, dated November 1, 1904.

Application filed January 6, 1904. Serial No. 187,873. (No model.)

*To all whom it may concern:*

Be it known that I, ELMER G. KAY, a citizen of the United States, and a resident of Everett, in the county of Snohomish and State of Washington, have invented certain new and useful Improvements in Eyeglasses, of which the following is a specification.

My invention relates to improvements in eyeglasses or eyeglass attachments designed particularly to be used by watch-makers, jewelers, and others who find it necessary to use a magnifying-glass in their work and who also are obliged to wear ordinary eyeglasses or spectacles by reason of defective eyesight.

The invention aims to provide a simple and inexpensive watch-maker's loop constructed to be combined with a pair of eyeglasses in a novel manner, so as to form a permanent part of the latter or a fixed part thereof during the use of the same in connection with the loop, and so mounted and arranged relative to the parts of the eyeglasses or spectacles that the magnifying-glass may occupy two positions, one in register with the axis of one of the ordinary lenses of the eyeglasses and in advance of the same and another entirely out of register with said lens and out of the line of vision.

To this end the invention includes the combination and arrangement of component parts and the details of construction to be hereinafter described, and particularly pointed out in the claims.

The preferred embodiments of my invention are illustrated in the accompanying drawings, in which—

Figure 1 shows in perspective the same embodied in a pair of spectacles. Fig. 2 is a plan view of the construction shown in Fig. 1. Fig. 3 is a cross-sectional view of the same. Fig. 4 is a front elevation of a modification. Fig. 5 is a side elevation of the same, parts being shown in section; and Fig. 6 is a perspective view showing another embodiment of the invention. Fig. 7 is a detail plan view. Fig. 8 is a perspective view of a modification.

In the exemplification of my invention disclosed in Figs. 1, 2, and 3 the same is embodied in that form of eyeglasses usually termed "spectacles" and includes generally a pair of lenses carried by a frame, a post secured at its inner end contiguous to the inner edge of one lens and projecting in advance thereof substantially at right angles to the face of the same, and a magnifying-glass mounted upon the outer end of the post and designed to occupy either a position in register with the axis of said lens or a second position entirely to one side of the lens.

In the drawings the lenses are designated by the letters $a$ $b$ and the frame by the letter $c$. The post (designated by the letter $d$) is rigidly attached at its inner end to the frame $c$, contiguous to the inner edge of the lens $a$, and extends outwardly substantially at right angles to the face of the latter. The magnifying-glass $e$ is movably mounted upon the outer end of the post $d$, so that it may occupy two positions relative to the lens $a$, one in register with the axis of the latter and another entirely to one side of the same. The mounting of the glass $e$ is so constructed that when the latter is in register with the lens $a$ the face thereof will be in a plane substantially parallel with the face of the lens. The particular form of mounting disclosed herein comprises an arm $f$, carrying a lens-frame $g$ at one end and a sleeve $h$ at its opposite end, through the bore of which the post $d$ extends to provide a pivotal connection between said post and the magnifying-glass $e$. Means are provided to limit the pivotal movement of the arm $f$ in order to arrest the lens in either of the two positions which it is intended to occupy and also to hold the same a fixed distance in advance of the lens $a$. In the exemplification of my invention disclosed herein coacting stops or shoulders on the post $d$ and sleeve $h$ are provided to perform said function. At the end of the post $d$ a shoulder $i$ is provided, which coacts with the outer end of the sleeve $h$ to prevent the axial movement of the latter in an outward direction, and other shoulders, $k$ $k'$, extending from the post $d$ coact with the opposite end of the sleeve to prevent the inward movement of the same. The shoulder $i$ is preferably displaceable to permit the sleeve $h$ to be placed on the post $d$, and the head of a screw fitted in the outer end of said post may be employed to constitute said shoulder. The shoulders $k$ $k'$ in addition to preventing axial movement of the sleeve $h$ act also to limit the turning movement of the same by coacting with shoulders $m$ $n$ upon the inner end of the latter. The shoulders $m$ $n$ are preferably formed by opposite sides of a lug extending inwardly from the inner end of the sleeve $h$. When the shoulders $m$ $k$ are in contact, the glass $e$ will rest in a position with its axis substantially in register with the axis of the lens $a$, while when the shoulders $n$ $k'$ are in contact the glass $e$ will occupy a position between the two lenses $a$ $b$ and a sufficient distance in advance of the same as to be entirely out of the way. The inner end of the post $d$ is preferably secured to the frame $c$ by soldering the same thereto, although any other means may be provided for rigidly securing said end to the frame.

In Figs. 4 and 5 the invention is shown as embodied in a pair of rimless eyeglasses or glasses of the pince-nez type. In this form of my invention the construction of magnifying-glass $e$ and the mounting of the same upon the post $d$ may be identical with that disclosed in Figs. 1, 2, and 3; but instead of soldering the inner end of the post to the eyeglass-frame this end $d'$ is threaded to engage the threads in the ears $o$ $o$, whereby the post is rigidly supported, and in addition said threaded end $d'$ serves as the ordinary pin which is utilized to hold the lens between said ears.

In the exemplification of my invention disclosed in Fig. 6 the same is shown as an attachment complete in itself, designed to be readily affixed to and detached from one of the lenses of a pair of eyeglasses. In this form of my invention the construction differs from that previously described only in the arrangement of the inner end of the post and the parts associated directly therewith. As shown in Fig. 6, the end of the post carries a spring attaching-loop $r$. This loop is preferably of semielliptical or U shape and is provided intermediate of its ends and at its ends with angularly-extending clips. The post is rigid with the intermediate portion of the loop, and the latter is disposed in a plane parallel with the face of the magnifying-glass. The attachment is secured to a pair of glasses by merely engaging the loop with the edge of one lens of the same, the clips $s$ embracing opposite faces of said lenses.

The construction and operation of my invention will be readily understood upon reference to the foregoing description and accompanying drawings, and it will be appreciated that the parts and combinations recited may be varied within a wide range without departing from the spirit and scope thereof.

Having thus described my invention, what is claimed as new, and desired to be secured by Letters Patent, is—

1. The combination with a pair of eyeglasses, of a post rigidly supported at its inner end adjacent the bridge-piece of the eyeglasses and extending in advance of the lenses, a second lens, and a frame carrying the same pivotally mounted on the outer end of the post, said post and second lens-frame having coacting stop-surfaces arranged to arrest the second lens in the line of vision or in a second position out of the line of vision and in the plane of the bridge-piece, substantially as described.

2. The combination with a pair of eyeglasses, of a post rigidly supported at its inner end and extending in advance of the lenses, a second lens, a frame carrying the same including a sleeve swiveled on the outer end of said post, said post having stop-surfaces extending radially from the same, and said sleeve having longitudinally-extending stop-surfaces coacting therewith, substantially as described.

3. The combination with a pair of eyeglasses, of a post rigidly supported at its inner end and extending in advance of the lenses, a second lens, a frame carrying the same, including a sleeve swiveled on the outer end of said post, a shoulder coacting with one end of the sleeve to limit the longitudinal movement thereof in one direction, and radial projections on the sleeve for limiting the longitudinal movement thereof in an opposite direction, the latter projections also serving to limit the turning movement of the sleeve, substantially as described.

4. In combination, a spring-frame having parts for embracing the edge of a lens, a post rigidly secured to said frame intermediate of the ends thereof, and a magnifying-glass secured to the outer end of the post, substantially as described.

5. In combination, a spring-frame having parts for embracing the edge of a lens, a post rigidly secured to said frame intermediate of the ends thereof, and a magnifying-glass pivotally secured to the outer end of the post, substantially as described.

6. The combination with the lens of an eyeglass, of a post rigidly secured at its inner end contiguous to one edge of said lens, a magnifying-glass, a mounting therefor including a sleeve swiveled upon the outer end of the post, and coacting shoulders on the post and sleeve to limit the movement of said magnifying-glass, substantially as described.

In testimony whereof I have hereunto signed my name, in the presence of two attesting witnesses, at Everett, in the county of Snohomish and State of Washington.

ELMER G. KAY.

Witnesses:
J. W. HEFFNER,
C. J. HILL.